United States Patent [19]

Jones

[11] 4,437,152
[45] Mar. 13, 1984

[54] CONTROL ARRANGEMENT FOR MULTIFUNCTION INDUSTRIAL MACHINE

[75] Inventor: Stephen H. Jones, LaFrance, S.C.

[73] Assignee: Nordson Corporation, Amherst, Ohio

[21] Appl. No.: 261,749

[22] Filed: May 8, 1981

[51] Int. Cl.³ .................... G06F 15/46; B65B 53/02
[52] U.S. Cl. ................................ 364/138; 53/557; 364/189; 364/400
[58] Field of Search .................. 364/140–147, 364/138, 139, 188, 189, 152–157, 160, 400, 200 MS File, 900 MS File; 53/427, 509, 556, 557

[56] References Cited

U.S. PATENT DOCUMENTS

| | | | |
|---|---|---|---|
| 3,815,313 | 6/1974 | Heisler | 53/557 X |
| 3,976,981 | 8/1976 | Bowden | 364/900 |
| 4,064,394 | 12/1977 | Allen | 364/200 X |
| 4,172,280 | 10/1979 | Spiesman | 364/900 |
| 4,180,860 | 12/1979 | Driscoll et al. | 364/188 |
| 4,188,617 | 2/1980 | Fauchier et al. | 364/900 X |
| 4,189,765 | 2/1980 | Kotalik et al. | 364/900 X |

Primary Examiner—Joseph F. Ruggiero
Attorney, Agent, or Firm—Wood, Herron & Evans

[57] ABSTRACT

A microcomputer based industrial machine control arrangement which includes several operator variable controls. The control arrangement is responsive to settings of the operator variable controls to establish parameters, such as time, in the operation of the machine. The control arrangement also receives a number of machine condition indications, such as through limit switches or the like, and produces various switching commands for elements of the machine during its operation. The particular control arrangement illustrated is described in conjunction with a skin packaging machine for the vacuum application of a film over goods to be packaged.

4 Claims, 8 Drawing Figures

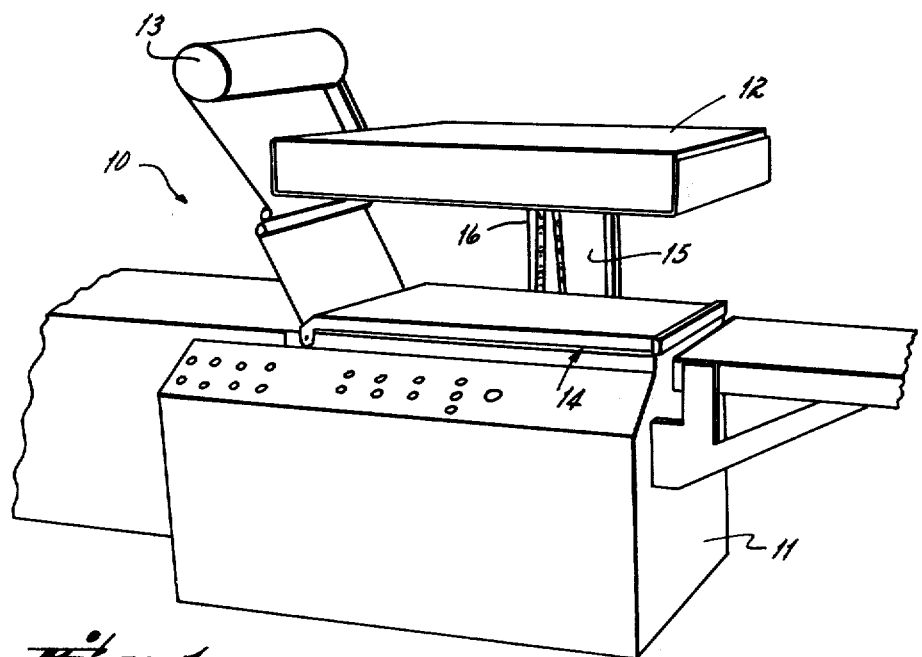
FIG. 1
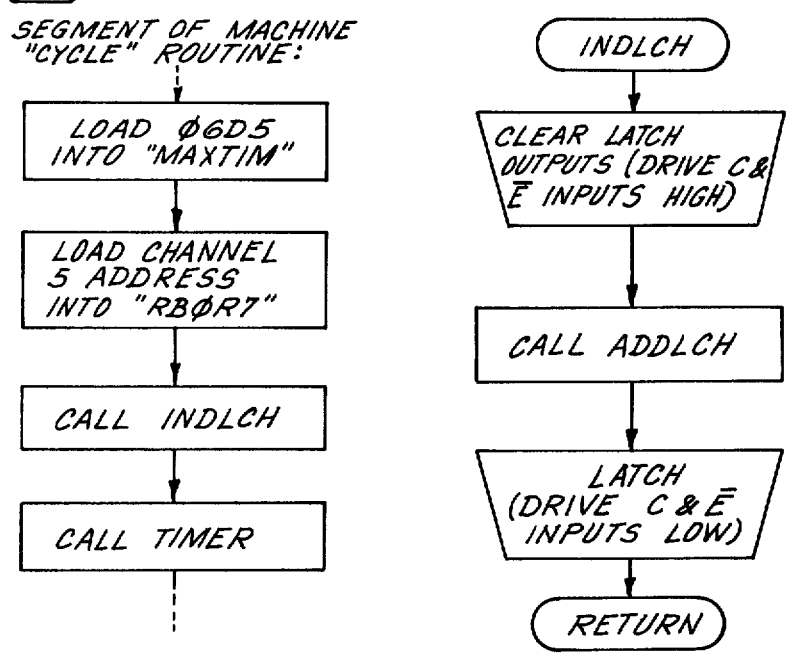
FIG. 3
FIG. 4

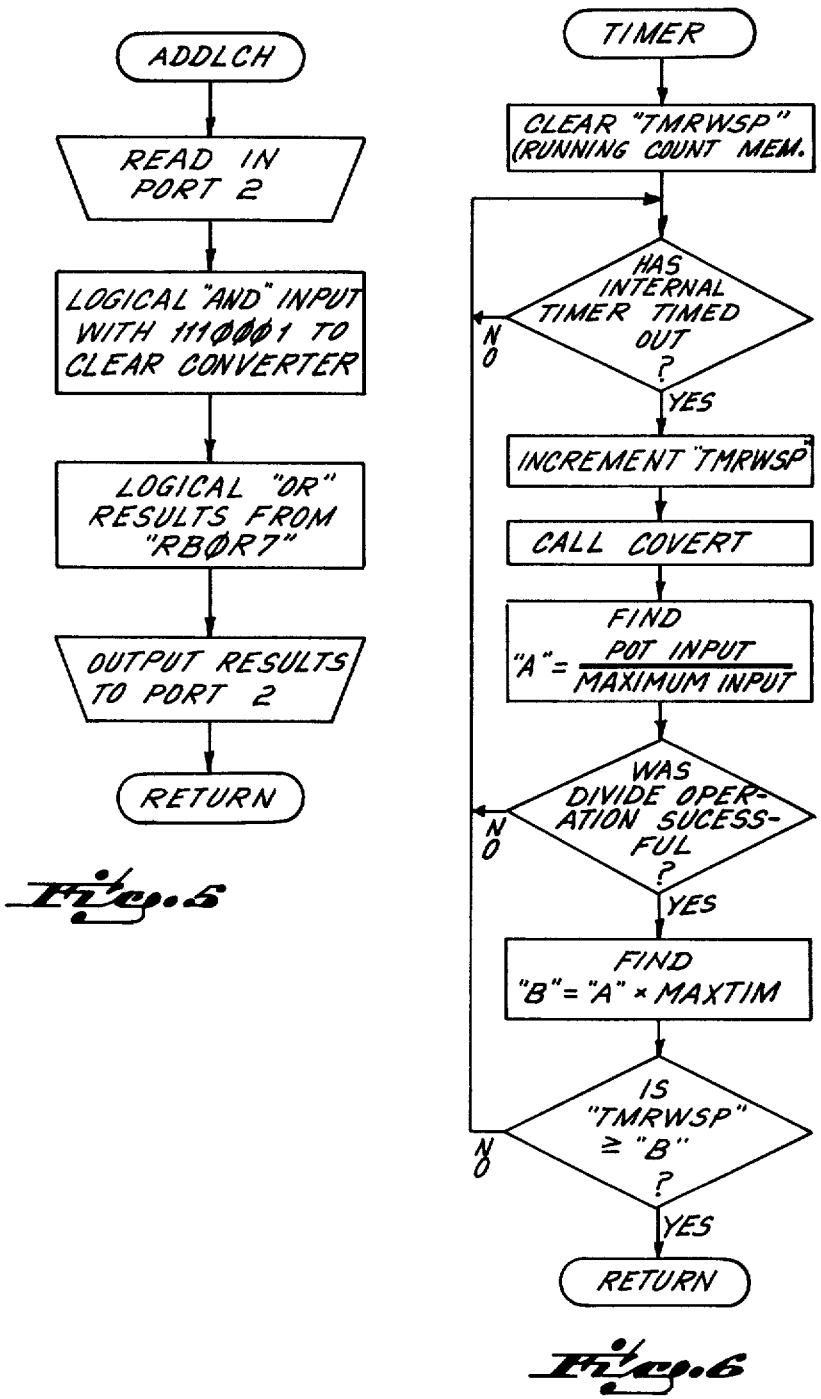

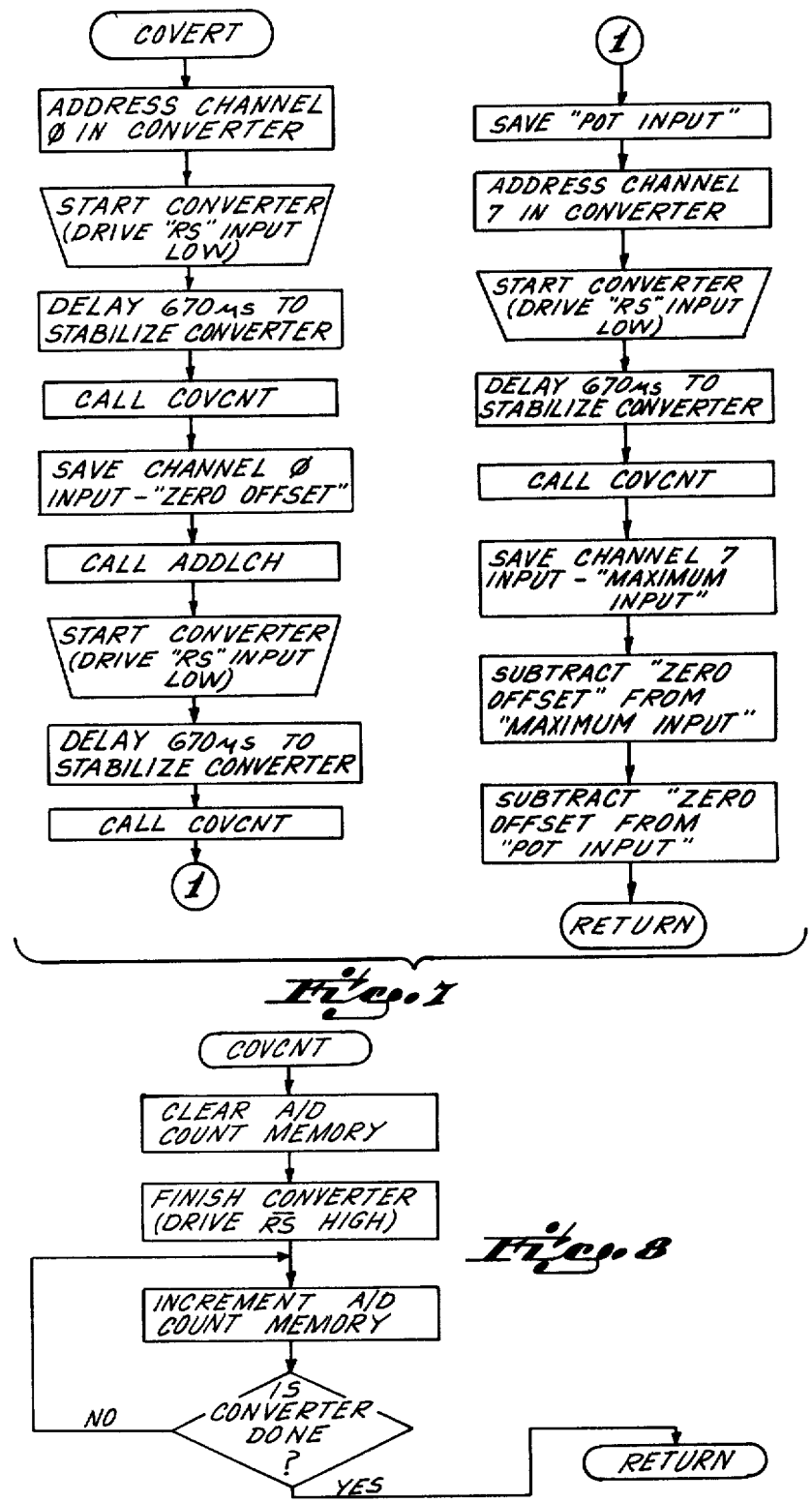

CONTROL ARRANGEMENT FOR MULTIFUNCTION INDUSTRIAL MACHINE

DESCRIPTION OF THE INVENTION

This invention relates generally to a control arrangement for an industrial machine and more particularly, concerns such an arrangement which includes a plurality of variable analog inputs.

A variety of programmable controllers are presently available for controlling the operation of industrial machines. Such controllers are typically capable of accepting various machine limit indications and controlling switches to operate the machine, usually during repeated cycles of operation. Such programmable controllers which are commercially available are expensive and require the use of additional costly interface elements in order to deal with many types of input parameters and output control functions.

So far as applicant is aware, such programmable controllers for industrial machines have not been adapted for use in systems involving operator variable controls. In the case of some operator controlled parameters, such as time settings, electromechanical alternatives to programmable controller interface elements are sufficiently cost effective to be used, thereby sacrificing some of the reliability and other advantages of a totally solid state control arrangement.

It is consequently an object of the present invention to provide a solid state, microcomputer based, control arrangement capable of interfacing with typical switch inputs and outputs for an industrial machine as well as inherently including a plurality of operator variable controls.

It is a further object of the present invention to provide such a control arrangement which is significantly less costly than conventional programmable controllers which themselves lack the construction of inherent operator variable controls.

It is a still further object of the invention to provide such a control arrangement which efficiently controls the operation of indicators associated with the variable analog inputs.

It is a subsidiary object of the present invention to provide such a control arrangement which is suited for the control of a skin packaging machine.

Other objects and advantages of the invention will become apparent upon reading the following detailed description and upon reference to the drawings, in which:

FIG. 1 is a diagrammatic perspective view of a skin packaging machine which may be controlled utilizing a control arrangement in accordance with the present invention;

FIG. 3 is a flow chart of the microcomputer routine for utilizing the output setting of an operator variable control;

FIGS. 4-8 are flow charts of various subroutines to execute the program steps of FIG. 3.

Figure 2:
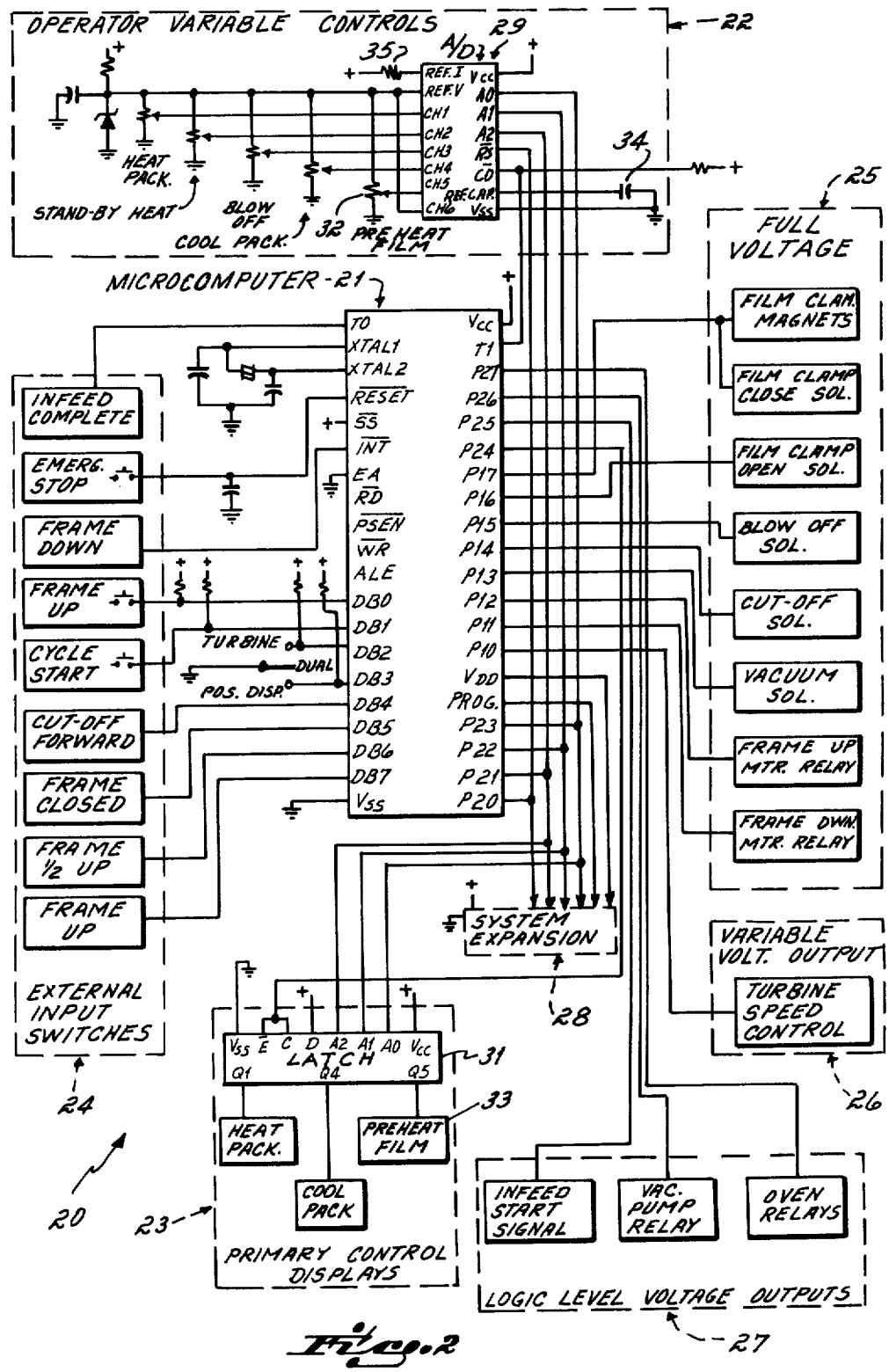
FIG. 2 is a schematic for a control arrangement for the machine in FIG. 1, shown partially in block diagram form.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalent, and alternatives falling within the spirit and scope of the invention as defined by the appended claims.

With initial reference to FIG. 1 in order to set an environment for the particular control arrangement to be described herein, a skin packaging machine 10 has a base 11 having a perforated plate on its upper surface and a source of vacuum (not shown) for application to the perforated plate. An oven 12 is mounted over the plate for the purpose of heating a film from a supply roll 13 which is to be drawn down to a substrate mounted on the perforated plate in order to surround an article which is to be packaged on the substrate. A film frame or clamp 14 is mounted above the base 11 and carries the film between two jaws which form the frame. The film, heated by the oven when the frame is in a raised position, is thereafter placed upon the substrate on the base 11 when the frame is in a lowered position. A mechanism is provided for moving the frame 14 from a position adjacent the oven 12 to a position adjacent the base 11. A post 15 supports the oven 12 relative to the base 11, and a guide shaft 16 cooperates with a carriage mechanism (not shown) coupled to the frame to permit the movement of the frame 14 between the oven and the perforated plate on the base 11.

Briefly, to operate the skin packaging machine, an operator pushes a FRAME UP control button which causes the frame 14 to rise to a position where engagement with a limit switch then causes it to stop. A card with the merchandise to be packaged is then positioned on the perforated plate on the base 11.

A second button, CYCLE START, is then depressed and the oven heaters are energized with full power. At the end of a period of time, the film becomes droopy and the frame is lowered, placing the film over the card with the article of merchandise. Substantially simultaneously, turbines are energized to cause a vacuum to be drawn through the perforated plate and the card so as to pull the film down upon the card and the article.

Again, after a period of time, the vacuum is turned off and the frame is opened up. The operator moves the product laterally away from the frame, thereby pulling a fresh supply of film into the frame. The frame clamp is then closed. A cut-off knife is operated to cut off the now-packaged product from the fresh supply of film. At this point, the cycle of operation is ready to be begun again.

With reference now to FIG. 2, a microcomputer based control arrangement, shown with its various control inputs and outputs, designated with the numeral 20, includes a microcomputer 21, an operator variable controls section 22, a primary control display section 23, a group of external input switches 24, a group of full voltage outputs 25, a variable voltage output section 26, a logic level voltage output section 27 and a system expansion section 28.

The microcomputer 21 is operable, under program control, to utilize the inputs from the control section 22 and switch section 24 to produce appropriate output signals for the display section 23 and the various controlled outputs 25, 26 and 27. The interaction between the microcomputer 21 and the operator variable controls 22 and displays 23 shall be described in more detail hereinafter.

The external input switches 24 provide on-off input information to the microcomputer 21 so that the microcomputer can operate the displays and controlled outputs. The EMERGENCY STOP, FRAME UP, and CYCLE START switches are operator available pushbutton switches. As indicated above in regard to the general operation of the skin packaging machine 10, the operator depresses the FRAME UP switch to position the frame adjacent the oven, and depresses the CYCLE START switch in order to begin a cycle of skin packaging.

The IN FEED COMPLETE switch indicates that a loaded card has been positioned on the base 11. The CUT OFF FORWARD switch indicates the film-cutting knife position. The FRAME CLOSED switch indicates that the next section of film from the roll has been clamped and that the frame may rise. The other three FRAME switches are limit switches indicating frame position.

In response to the various inputs, the microcomputer 21 controls a group of full voltage, 120 volts ac, outputs 25. In the illustrated system, these controls are for energization of magnets holding the film clamp together, a solenoid for closing the film clamp, a solenoid for opening the film clamp, a solenoid for controlling blow off (which is utilized in a blister pack variation of the above described film packaging method) a solenoid controlling the application of additional vacuum, and the relays operable to move the frame up and down.

A variable voltage output may be provided to a turbine speed control, with the turbine providing the primary vacuum for the skin packaging operation. In addition, logic level outputs (at a typical five volts dc) are provided to initiate the infeed of a card, operating a vacuum pump to maintain the vacuum reserve capability, and oven relays for energizing the film heating oven. The system expansion section 28 is to provide the capability of increasing the number of inputs and outputs.

In accordance with the invention, the control arrangement 20 also interfaces with operator variable control inputs through an operator variable control section 22. The control section 22 cooperates with the microcomputer 21 to provide operator variable control capabilities and also to maintain several displays corresponding to individual ones of the operator variable controls.

In the illustrated form, each of the operator variable controls are proportional controls indicating a percentage of some maximum value. The microcomputer 21 has stored therein the respective maximum values and executes a cycle of program routines for determining each proportional value. Each proportional value is based upon the respective control setting, and the microcomputer utilizes these values in controlling the various outputs. In the present system, four of the five operator variable controls are time controls. Therefore, the control arrangement utilizes the various control settings to set the timing for various phases of the shrink packaging machine cycle. The primary control display section 23 includes three displays corresponding to three of the operator variable controls, and these displays are activated during the corresponding timed segments of the machine cycle.

In order to control the machine cycle in response to a given one of the variable controls 22, the microcomputer addresses a multi-channel analog-to-digital converter and reads the control setting. The microcomputer converts the control setting to a usable parameter value and effects the operation of the appropriate outputs. If the particular control is a timing control, the microcomputer internally times out the appropriate length of time for that segment of the machine cycle. If the particular control has a corresponding indicator 23, the microcomputer maintains that indicator energized during the respective cycle segment by the operation of a latch 31.

Each of the operator variable controls in the control section 22 comprises a potentiometer 32, the output of which is coupled to the analog-to-digital converter 29 and is settable between ground and a reference voltage. Each of the potentiometers, except for STAND BY HEAT, provide at their wiper arm outputs a voltage indicative of a percentage of a period of time. For example, the maximum period of time for the PREHEAT FILM potentiometer is 60 seconds and the output of the potentiometer represents a range between zero and 100% of that time duration. The STAND BY HEAT potentiometer setting is indicative of between zero and 50% of the maximum oven energization when the oven is not actually heating the film.

The analog-to-digital converter 29 is a Motorola type MC14443 analog-to-digital converter linear subsystem. The various operations such as addressing, counting, etc. are provided by the microcomputer 21. The microcomputer 21 is an Intel 8748-8 single component 8-bit microcomputer. The microcomputer 21 also supplies the addressing and control signals for the latch 31, which is a National Semiconductor CD4099 addressable latch.

In operation, the microcomputer first responds to the depression of the FRAME UP button to move the frame adjacent the oven. The microcomputer is then responsive to the depression of the CYCLE START button to begin a cycle of operation of the skin packaging machine wherein the microcomputer sequentially executes the various routine segments for the machine cycle. During operation of a cycle, the microcomputer also effects the operation of an internal timer which times out repeatedly approximately every 34 milliseconds using a 3.58 megahertz crystal. This enables the microcomputer to issue the appropriate output commands on a real time basis.

In order to further describe in detail the manner in which the microcomputer cooperates with the operator variable control inputs, the microcomputer operation for an exemplary routine segment, the PREHEAT FILM segment, shall be described in detail in conjunction with the flow charts of FIGS. 3–8.

With initial reference to FIG. 3, after the CYCLE START button has been pushed and the necessary initial output commands issued by the microcomputer, the PREHEAT FILM segment of the machine cycle routine begins. First, the maximum segment time, 60 seconds, for the PREHEAT FILM segment is loaded into a register MAXTIM. 06D5 is a hexadecimal number representing the count required, for counts occurring every 34 milliseconds, to achieve 60 seconds. Next, the address for channel 5 (the input from potentiometer 32 to the A/D converter 29) is placed into another register designated RB0R7. Then, an indicator latch routine is executed to clear the indicators 23 and then establish the proper indicator on as defined by the contents of the register RB0R7. This routine is illustrated in FIG. 4.

With reference to the routine of FIG. 4, the latch outputs are cleared, assuring that all of the indicators are de-energized, and an address latch routine is then performed. This address latch routine is shown in FIG. 5.

Referring to FIG. 5, the address latch routine establishes the address defined in the contents of RB0R7 for both the latch 31 and the converter 29. Since the microcomputer port 2, terminals P20–P27, must be addressed as a group, the ADDLCH routine is necessary to produce changes only on the address lines P23–P21. The sequential AND OR operations in this routine leave the other port 2 lines at their original state. The channel 5 address is thereby also placed on the lines P23–P21.

Returning to the indicator latch routine of FIG. 4, the latch 31 (addressed with the channel 5 PREHEAT FILM address) is set to energize the PREHEAT FILM indicator 33. The latch will maintain this indicator energized regardless of further changes on the address lines P23–P21 until the latch is cleared, such as at the beginning at the next main routine segment.

Returning to FIG. 3, after the indicator latch is set, the appropriate timing for this PREHEAT FILM segment must be derived from the setting of the potentiometer 32. In order to do this, the TIMER routine of FIG. 6 is executed.

With reference to FIG. 6, a register designated TMRWSP (timer work space) is cleared. This is the running time count memory indicative of the amount of time which has expired since the register was cleared at the beginning of a segment.

The microcomputer then waits until the internal timer has timed out, which will take between 0 and 34 milliseconds depending upon the timer phase when this routine is entered. When the timer has timed out, the timer work space register is incremented by one and a conversion routine, COVERT, is executed. This routine is illustrated in FIG. 7. The COVERT routine performs the actual analog-to-digital conversion of the pot setting. The total conversion time is approximately 2.5 milliseconds, maximum, for a 100% potentiometer input.

In order to explain briefly the operation of the converter subsystem 29 and with reference to FIG. 2, the microcomputer 21 cooperates with the converter 29 to count the time required to discharge a capacitor 34. This time is linearly related to the voltage input on an addressed channel of the converter 29, which voltage is transferred to the capacitor. The START CONVERTER step effects transfer of the channel 5 voltage to the capacitor. Then there is a delay stabilizing the capacitor voltage. In the present instance, in the routine of FIG. 7, the microcomputer determines three capacitor discharge time counts representative of three different voltages associated with the converter 29. First, the microcomputer determines a count corresponding to the ground of the converter 29, then a count representative of the channel 5 input for PREHEAT FILM, and finally, a count representative of the reference voltage level for the converter. The first reading is designated ZERO OFFSET, the second reading is designated POT INPUT, and the third reading is designated MAXIMUM INPUT. The conversion routine of FIG. 7 concludes by subtracting the zero offset from each of the other two readings prior to returning to the TIMER ROUTINE of FIG. 6.

The COVCNT, conversion count, routine for determining each of the three readings (ZERO OFFSET, POT INPUT and MAXIMUM INPUT) is shown in FIG. 8. The microcomputer count memory is cleared and then a count accumulated therein until the converter has finished discharging the capacitor 34, which is indicated by the converter CO output going low. The counting rate in the count memory is approximately one count every 12.5 microseconds. With the capacitor 34 being 0.01 microfarads and a resistor 35 associated with the converter being 100 K ohms. the maximum input count is approximately 150.

Returning to the TIMER ROUTINE of FIG. 6, after the conversion routine, COVERT, the POT INPUT value (with ZERO OFFSET subtracted) is divided by the MAX INPUT value (with ZERO OFFSET subtracted) to develop a ratio A. This ratio is then multiplied by MAXTIM (which in this case is 60 seconds) to determine a segment time B. As long as the accumulated time in TMRWSP (timer work space) is less than B, the microcomputer will operate within the TIMER routine to continue incrementing the timer work space. When the timer work space count becomes greater than or equal to B, the microcomputer returns to the original routine of FIG. 3.

This marks the end of the PREHEAT FILM segment, and the microcomputer executes the next appropriate commands in accordance with the cycle program. Subsequently, the HEAT PACKAGE segment begins with its associated indicator being latched through the latch 31 and the HEAT PACKAGE segment time being determined in the same manner as that described above for PREHEAT FILM.

In summary, in each segment, first the maximum time for the variable control is defined. Second, the variable control (and accompanying indicator) to be used is addressed. Third, the indicator is turned on (and all others turned off). Fourth, the time delay defined by the variable control is implemented. It should be noted that in implementing the time delay, the TIMER routine (FIG. 6) checks the potentiometer set point every 34 milliseconds. This enables the operator to change the potentiometer setpoint during the time cycle and the controller will effectively "immediately" recognize the change. Otherwise, if only one calculation/check were made for the potentiometer setpoint, namely, at the beginning of the routine, the operator would not be able to alter the time called for by the potentiometer setting at the beginning of the delay period. This capability is particularly advantageous when an operator is determining the optimum segment times for a new combination of card, film and objects to be packaged.

Attached as an Appendix hereto is a program listing for the microcomputer 21 to perform all of the control functions for a skin packaging machine, including the interfacing of the operator variable controls and the utilization of their settings.

SOFTWARE PROGRAM LISTING

MAKER S.H.J. 4/1/81 (SUB)ROUTINE RESET / INT. JUMPS

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 000 | 04 |  | JMP | RESET | GO TO INITIALIZE |
| 001 | 10 |  |  |  |  |
| 002 |  |  |  |  |  |
| 003 |  |  |  |  |  |
| 004 |  |  |  |  |  |
| 005 |  |  |  |  |  |
| 006 |  |  |  |  |  |
| 007 | 24 |  | JMP | RSDHLT | TIMER INT. ROUTINE- |
| 008 | 20 |  |  |  | HANDLE 34 MS. |
| 009 |  |  |  |  | PERIODIC FUNCTIONS. |
| 00A |  |  |  |  |  |
| 00B |  |  |  |  |  |
| 00C |  |  |  |  |  |
| 00D |  |  |  |  |  |
| 00E |  |  |  |  |  |
| 00F |  |  |  |  |  |

SOFTWARE PROGRAM LISTING

MAKER S.H.J. 4/1/81 (SUB)ROUTINE RESET

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 010 | BF | RESET: | MOV | R7,CH0ADD | CLEAR LED'S |
| 011 | 1F |  |  |  | BY ADDRESSING |
| 012 | 54 |  | CALL | INDLCH | CHANNEL 0 & LATCH |
| 013 | 70 |  |  |  |  |
| 014 | B8 |  | MOV | R0,3FH | CLEAR ALL |
| 015 | 3F |  |  |  | DATA |
| 016 | 27 |  | CLR | A | MEMORY |
| 017 | A0 | CLRLOP: | MOV | @R0,A |  |
| 018 | E8 |  | DJNZ | R0,CLRLOP |  |
| 019 | 17 |  |  |  |  |
| 01A | 62 |  | MOV | T,A | CLEAR TIMER & |
| 01B | 55 |  | STRT | T | START RESID. |
| 01C | 25 |  | EN | TCNTI | HEAT SYSTEM |
| 01D | 04 | RESTRT: | JMP | FRMLOP |  |
| 01E | 30 |  |  |  | JUMP TO |
| 01F |  |  |  |  | FRAME UP P.B. LOOP |
| 020 |  |  |  |  |  |
| 021 |  |  |  |  |  |
| 022 |  |  |  |  |  |
| 023 |  |  |  |  |  |
| 024 |  |  |  |  |  |
| 025 |  |  |  |  |  |
| 026 |  |  |  |  |  |
| 027 |  |  |  |  |  |
| 028 |  |  |  |  |  |

SOFTWARE PROGRAM LISTING—Continued

MAKER S.H.J. 4/1/81  (SUB)ROUTINE RESET
CHKR.                PRODUCT LINE SHIPMATE
ENGR. S.H.J. 4/1/81  MODEL # D

| LOC | CODE | LABEL | OPERATION | OPERAND | COMMENTS |
|-----|------|-------|-----------|---------|----------|
| 029 |      |       |           |         |          |
| 02A |      |       |           |         |          |
| 02B |      |       |           |         |          |
| 02C |      |       |           |         |          |
| 02D |      |       |           |         |          |
| 02E |      |       |           |         |          |
| 02F |      |       |           |         |          |

SOFTWARE PROGRAM LISTING                    AMPAK DIVISION/NORD

MAKER S.H.J. 4/1/81  (SUB)ROUTINE FRMLOP
CHKR.                PRODUCT LINE SHIPMATE
ENGR. S.H.J. 4/1/81  MODEL # D

| LOC | CODE | LABEL   | OPERATION | OPERAND | COMMENTS |
|-----|------|---------|-----------|---------|----------|
| 030 | 09   | FRMLOP: | IN        | A,P1    | IF FRAME IS RUNNING |
| 031 | 37   |         | CPL       | A       | DOWN, WAIT UNTIL |
| 032 | 32   |         | JB1       | FRMLOP  | STOPPED. |
| 033 | 30   |         |           |         |          |
| 034 | 08   |         | INS       | A,BUS   | IF FRAME IS |
| 035 | 37   |         | CPL       | A       | UP, GO TO LOOP |
| 036 | F2   |         | JB7       | SRTLOP  | ON START BUTTON. |
| 037 | 40   |         |           |         |          |
| 038 | 08   | FRMBLP: | INS       | A,BUS   | ELSE LOOP ON |
| 039 | 12   |         | JB0       | FRMBLP  | FRAME BUTTON. |
| 03A | 38   |         |           |         |          |
| 03B | 14   |         | CALL      | FRAMEU  |          |
| 03C | 90   |         |           |         |          |
| 03D | 04   |         | JMP       | SRTLOP  |          |
| 03E | 40   |         |           |         |          |
| 03F |      |         |           |         |          |

SOFTWARE PROGRAM LISTING                    AMPAK DIVISION/NORDS

MAKER S.H.J. 4/1/81  (SUB)ROUTINE SRTLOP
CHKR.                PRODUCT LINE SHIPMATE
ENGR. S.H.J. 4/1/81  MODEL # D

| LOC | CODE | LABEL   | OPERATION | OPERAND | COMMENTS |
|-----|------|---------|-----------|---------|----------|
| 040 | 36   | SRTLOP: | JT0       | SRTLOP  | LOOP IF PLATEN NOT IN POSITION |
| 041 | 40   |         |           |         |          |
| 042 | 08   |         | INS       | A,BUS   | LOOP IF START P.B. NOT PUSHED |
| 043 | 32   |         | JB1       | SRTLOP  |          |
| 044 | 40   |         |           |         |          |

SOFTWARE PROGRAM LISTING—Continued

AMPAK DIVISION/NORDS

MAKER S.H.J. 4/1/81  (SUB)ROUTINE SRTLOP

CHKR. _____  PRODUCT LINE SHIPMATE

ENGR. S.H.J. 4/1/81  MODEL # D

| LOC | CODE | LABEL | OPERATION | OPERAND | COMMENTS |
|-----|------|-------|-----------|---------|----------|
| 045 | 04   |       | JMP       | CYCLE   | START PUSHED - DO CYCLE |
| 046 | 50   |       |           |         |          |
| 047 |      |       |           |         |          |
| 048 |      |       |           |         |          |
| 049 |      |       |           |         |          |
| 04A |      |       |           |         |          |
| 04B |      |       |           |         |          |
| 04C |      |       |           |         |          |
| 04D |      |       |           |         |          |
| 04E |      |       |           |         |          |
| 04F |      |       |           |         |          |
| 000 |      |       |           |         |          |
| 001 |      |       |           |         |          |
| 002 |      |       |           |         |          |
| 003 |      |       |           |         |          |
| 004 |      |       |           |         |          |
| 005 |      |       |           |         |          |
| 006 |      |       |           |         |          |
| 007 |      |       |           |         |          |
| 008 |      |       |           |         |          |
| 009 |      |       |           |         |          |
| 00A |      |       |           |         |          |
| 00B |      |       |           |         |          |
| 00C |      |       |           |         |          |
| 00D |      |       |           |         |          |
| 00E |      |       |           |         |          |
| 00F |      |       |           |         |          |

SOFTWARE PROGRAM LISTING

AMPAK DIVISION/NORI

MAKER S.H.J. 4/1/81  (SUB)ROUTINE CYCLE

CHKR. _____  PRODUCT LINE SHIPMATE

ENGR. S.H.J. 4/1/81  MODEL # D

| LOC | CODE | LABEL  | OPERATION | OPERAND   | COMMENTS |
|-----|------|--------|-----------|-----------|----------|
| 050 | 9A   | CYCLE: | ANL       | P2,OVENON | TURN OVEN ON |
| 051 | F7   |        |           |           |          |
| 052 | A5   |        | CLR       | F1        | ESTABLISH FULL HEAT FLAG |
| 053 | B5   |        | CPL       | F1        |          |
| 054 | B8   |        | MOV       | R0,MAXTIM |          |
| 055 | 20   |        |           |           | LOAD MAXTIM WITH 6D5H WHICH IS = TO 60 SECONDS |
| 056 | B0   |        | MOV       | @R0,0D5H  |          |
| 057 | D5   |        |           |           |          |
| 058 | 18   |        | INC       | R0        |          |
| 059 | B0   |        | MOV       | @R0,06H   |          |
| 05A | 06   |        |           |           |          |

SOFTWARE PROGRAM LISTING  AMPAK DIVISION/NORD

MAKER S.H.J.   4/1/81   (SUB)ROUTINE CYCLE

CHKR.                    PRODUCT LINE SHIPMATE

ENGR. S.H.J.   4/1/81   MODEL #   D

| LOC | CODE | LABEL | OPERATION | OPERAND | COMMENTS |
|-----|------|-------|-----------|---------|----------|
| 05B | BF   |       | MOV       | R7,CH5ADD | ADDRESS PREHEAT |
| 05C | A0   |       |           |         | FILM POT, SET LED, |
| 05D | 54   |       | CALL      | INDLCH  | AND CALL |
| 05E | 70   |       |           |         | FOR TIME. |
| 05F | 14   |       | CALL      | TIMER   |          |
| 060 | B0   |       |           |         |          |
| 061 | 99   |       | ANL       | P1,FDON*TBON | TURN ON FRAME |
| 062 | FC   |       |           |         | DOWN AND TURBINE |
| 063 | 1E   |       | INC       | R6      | START FRAME DOWN TMR. |
| 064 | B8   |       | MOV       | R0,MAXTIM |        |
| 065 | 20   |       |           |         | LOAD MAXTIM |
| 066 | B0   |       | MOV       | @R0,6BH | WITH 36BH |
| 067 | 6B   |       |           |         | WHICH IS = TO |
| 068 | 18   |       | INC       | R0      | 30 SECONDS. |
| 069 | B0   |       | MOV       | @R0,03H |          |
| 06A | 03   |       |           |         |          |
| 06B | BF   |       | MOV       | R7,CH1ADD | ADDRESS HEAT |
| 06C | 80   |       |           |         | PACKAGE POT, SET |
| 06D | 54   |       | CALL      | INDLCH  | LED, AND CALL |
| 06E | 70   |       |           |         | FOR TIME. |
| 06F | 14   |       | CALL      | TIMER   |          |
| 071 | 8A   |       | ORL       | P2,OVENOF | TURN OVEN |
| 072 | 08   |       |           |         | OFF |
| 073 | A5   |       | CLR       | F1      | RESET FULL HEAT FLAG |
| 074 | B8   |       | MOV       | R0,MAXTIM | LOAD MAXTIM |
| 075 | 20   |       |           |         | WITH 36BH |
| 076 | B0   |       | MOV       | @R0,6BH | WHICH IS = TO |
| 077 | 6B   |       |           |         | 30 SECONDS |
| 078 | 18   |       | INC       | R0      |          |
| 079 | B0   |       | MOV       | @R0,03H |          |
| 07A | 03   |       |           |         |          |
| 07B | BF   |       | MOV       | R7,CH4ADD | ADDRESS COOL |
| 07C | 20   |       |           |         | PACKAGE POT, |
| 07D | 54   |       | CALL      | INDLCH  | SET LED, AND |
| 07E | 70   |       |           |         | CALL FOR TIME. |
| 07F | 14   |       | CALL      | TIMER   |          |
| 080 | B0   |       |           |         |          |
| 081 | 85   | ENDCYC: | CLR     | F0      |          |
| 082 | A5   |       | CLR       | F1      | CLEAR ALL |
| 083 | 27   |       | CLR       | A       | FLAGS, F.D. TIMER, & |
| 084 | 37   |       | CPL       | A       | OUTPUTS. |
| 085 | 89   |       | ORL       | P1,0FDH |          |
| 086 | FD   |       |           |         |          |
| 087 | 3A   |       | OUTL      | P2,A    |          |
| 088 | BA   |       | MOV       | R2,0FDH | WAIT - 32 MS. |
| 089 | FD   |       |           |         | TO ALLOW POSSIBLE |
| 08A | 14   |       | CALL      | DELAY   | FRAME MOTOR |
| 08B | F0   |       |           |         | OPERATION |
| 08C | 04   |       | JMP       | RESTRT  | GO TO RESTART- |
| 08D | 1D   |       |           |         | POLL BUTTONS |
| 08E |      |       |           |         |          |
| 08F |      |       |           |         |          |

SOFTWARE PROGRAM LISTING                               AMPAK DIVISION/NORD

MAKER  S.H.J.    4/1/81    (SUB)ROUTINE  FRAMEU

CHKR.                      PRODUCT LINE  SHIPMATE

ENGR.  S.H.J.    4/1/81    MODEL #       D

| LOC | CODE | LABEL | OPERATION | OPERAND | COMMENTS |
|---|---|---|---|---|---|
| 090 | 08 | FRAMEU: | INS | A,BUS | ⎤ IF FRAME IS NOT |
| 091 | F2 |  | JB7 | FRAMNU | ⎥ UP, GO TO PUT |
| 092 | 95 |  |  |  | ⎦ FRAME UP. |
| 093 | 04 |  | JMP | FRISUP | ⎤ ELSE GO TO |
| 094 | 9B |  |  |  | ⎦ STOP FRAME |
| 095 | 99 | FRAMNU: | ANL | P1,FRUON | ⎤ TURN ON FRAME |
| 096 | FB |  |  |  | ⎥ UP, TURN OFF |
| 097 | 89 |  | ORL | P1,FRDOF | ⎥ FRAME DOWN |
| 098 | 02 |  |  |  | ⎥ AND LOOP. |
| 099 | 04 |  | JMP | FRAMEU | ⎦ |
| 09A | 90 |  |  |  |  |
| 09B | 89 | FRISUP: | ORL | P1,FRUOF | ⎤ STOP FRAME |
| 09C | 04 |  |  |  | ⎥ AND RETURN. |
| 09D | 83 |  | RET |  | ⎦ |
| 09E |  |  |  |  |  |
| 09F |  |  |  |  |  |
| 0A0 |  |  |  |  |  |
| 0A1 |  |  |  |  |  |
| 0A2 |  |  |  |  |  |
| 0A3 |  |  |  |  |  |
| 0A4 |  |  |  |  |  |
| 0A5 |  |  |  |  |  |
| 0A6 |  |  |  |  |  |
| 0A7 |  |  |  |  |  |
| 0A8 |  |  |  |  |  |
| 0A9 |  |  |  |  |  |
| 0AA |  |  |  |  |  |
| 0AB |  |  |  |  |  |
| 0AC |  |  |  |  |  |
| 0AD |  |  |  |  |  |
| 0AE |  |  |  |  |  |
| 0AF |  |  |  |  |  |

SOFTWARE PROGRAM LISTING                               AMPAK DIVISION/NORD

MAKER  S.H.J.    4/1/81    (SUB)ROUTINE  TIMER

CHKR.                      PRODUCT LINE  SHIPMATE

ENGR.  S.H.J.    4/1/81    MODEL #       D

| LOC | CODE | LABEL | OPERATION | OPERAND | COMMENTS |
|---|---|---|---|---|---|
| 0B0 | B8 | TIMER: | MOV | R0,TMRWSP | ⎤ |
| 0B1 | 22 |  |  |  | ⎥ |
| 0B2 | 27 |  | CLR | A | ⎥ CLEAR TIMER |
| 0B3 | A0 |  | MOV | @R0,A | ⎥ WORKSPACE |
| 0B4 | 18 |  | INC | R0 | ⎦ (TMRWSP) |
| 0B5 | A0 |  | MOV | @R0,A |  |
| 0B6 | 85 |  | CLR | F0 | ⎤ SET "TIMER" |
| 0B7 | 95 |  | CPL | F0 | ⎦ FLAG ON |

SOFTWARE PROGRAM LISTING

AMPAK DIVISION/NORDS(

MAKER S.H.J. 4/1/81  (SUB)ROUTINE  TIMER

CHKR. _____       PRODUCT LINE  SHIPMATE

ENGR. S.H.J. 4/1/81     MODEL #  D

| LOC | CODE | LABEL | OPERATION | OPERAND | COMMENTS |
|-----|------|-------|-----------|---------|----------|
| 0B8 | 42   | TSTLOP: | MOV | A,T | |
| 0B9 | 37   |       | CPL | A   | WAIT UNTIL INTERNAL |
| 0BA | 03   |       | ADD | A,80H | TIMER HAS REACHED |
| 0BB | 80   |       |     |     | HALFWAY (128 |
| 0BC | 96   |       | JNZ | TSTLOP | COUNTS) |
| 0BD | B8   |       |     |     | |
| 0BE | 34   |       | CALL | COVERT | GET POT SETPOINT |
| 0BF | A0   |       |      |        | AND MAXIMUM |
| 0C0 | B8   |       | MOV | R0,COWSP2 | |
| 0C1 | 25   |       |     |     | PUT MAXIMUM IN |
| 0C2 | F0   |       | MOV | A,@R0 | R1 |
| 0C3 | A9   |       | MOV | R1,A | |
| 0C4 | C8   |       | DEC | R0 | |
| 0C5 | F0   |       | MOV | A,@R0 | PUT SETPOINT IN |
| 0C6 | A8   |       | MOV | R0,A | R0 |
| 0C7 | 27   |       | CLR | A | |
| 0C8 | 54   |       | CALL | DIVIDE | DIVIDE SETPOINT |
| 0C9 | 30   |       |      |        | BY MAXIMUM |
| 0CA | F6   |       | JC   | TSTLOP | IF DIVIDE ERRORED, |
| 0CB | B8   |       |      |        | TRY AGAIN. |
| 0CC | A9   |       | MOV  | R1,A   | PUT RESULTS IN R1 |
| 0CD | B8   |       | MOV  | R0,MAXTIM | GET LOWER MAXTIM |
| 0CE | 20   |       |      |        | BYTE AND MULTIPLY |
| 0CF | F0   |       | MOV  | A,@R0  | RESULTS WITH IT. |
| 0D0 | 54   |       | CALL | MLTPLY | |
| 0D1 | 10   |       |      |        | |
| 0D2 | F8   |       | MOV  | A,R0   | PUT MSB RESULTS IN |
| 0D3 | AB   |       | MOV  | R3,A   | R3 |
| 0D4 | B8   |       | MOV  | R0,MAXTIM+1 | GET UPPER MAXTIM |
| 0D5 | 21   |       |      |        | BYTE AND MULTIPLY |
| 0D6 | F0   |       | MOV  | A,@R0  | EARLIER RESULTS |
| 0D7 | 54   |       | CALL | MLTPLY | WITH IT. |
| 0D8 | 10   |       |      |        | |
| 0D9 | 6B   |       | ADD  | A,R3   | ADD PREVIOUS |
| 0DA | E6   |       | JNC  | NOTMRC | "MULTIPLY" RESULTS |
| 0DB | DD   |       |      |        | TO LATEST |
| 0DC | 18   |       | INC  | R0     | RESULTS |
| 0DD | AC   | NOTMRC: | MOV | R4,A | PUT RESULTS IN |
| 0DE | F8   |       | MOV  | A,R0   | R4/R5 (LSB/MSB) |
| 0DF | AD   |       | MOV  | R5,A   | |
| 0E0 | B8   |       | MOV  | R0,TMRWSP | |
| 0E1 | 22   |       |      |        | GET TIMER WORKSPACE |
| 0E2 | F0   |       | MOV  | A,@R0  | COUNT AND PUT |
| 0E3 | AA   |       | MOV  | R2,A   | IN R2/R3 |
| 0E4 | 18   |       | INC  | R0     | (LSB/MSB) |
| 0E5 | F0   |       | MOV  | A,@R0  | |
| 0E6 | AB   |       | MOV  | R3,A   | |
| 0E7 | 34   |       | CALL | CMPADD | COMPARE SET TIME |
| 0E8 | 10   |       |      |        | AGAINST REAL TIME- |
| 0E9 | E6   |       | JNC  | TSTLOP | IF SET TIMER LESS THAN |
| 0EA | B8   |       |      |        | REAL TIME, CONTINUE LOOPING |
| 0EB | 95   |       | CLR  | F0     | ELSE RESET TIMER |
| 0EC | 83   |       | RET  |        | FLAG & RETURN. |
| 0ED |      |       |      |        | |
| 0EE |      |       |      |        | |
| 0EF |      |       |      |        | |

SOFTWARE PROGRAM LISTING

MAKER S.H.J. 4/1/81 (SUB)ROUTINE DELAY

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 0F0 | 42 | DELAY: | MOV | A,T | GET 2'S COMPLEMENT |
| 0F1 | 6A |  | ADD | A,R2 | OF INTERNAL TIMER |
| 0F2 | 37 |  | CPL | A | +R2, STORE IN |
| 0F3 | 17 |  | INC | A | R3. |
| 0F4 | AB |  | MOV | R3,A |  |
| 0F5 | 42 | DELLCP: | MOV | A,T | LOOP UNTIL SUM |
| 0F6 | 6B |  | ADD | A,R3 | OF INT. TIMER & |
| 0F7 | 96 |  | JNZ | DELLOP | R3 IS ZERO. |
| 0F8 | F5 |  |  |  |  |
| 0F9 | 83 |  | RET |  |  |
| 0FA |  |  |  |  |  |
| 0FB |  |  |  |  |  |
| 0FC |  |  |  |  |  |
| 0FD |  |  |  |  |  |
| 0FE |  |  |  |  |  |

SOFTWARE PROGRAM LISTING

MAKER S.H.J. 4/1/81 (SUB)ROUTINE CMPBYT

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 100 | FB | CMPBYT: | MOV | A,R3 | IF R3 IS LESS THAN OR |
| 101 | 37 |  | CPL | A | EQUAL TO R2, CARRY IS |
| 102 | 17 |  | INC | A | RETURNED ON, ELSE R3 |
| 103 | 6A |  | ADD | A,R2 | GREATER THAN R2, CARRY |
| 104 | 83 |  | RET |  | IS RETURNED OFF. |
| 105 |  |  |  |  |  |
| 106 |  |  |  |  |  |
| 107 |  |  |  |  |  |
| 108 |  |  |  |  |  |
| 109 |  |  |  |  |  |
| 10A |  |  |  |  |  |
| 10B |  |  |  |  |  |
| 10C |  |  |  |  |  |
| 10D |  |  |  |  |  |
| 10E |  |  |  |  |  |
| 10F |  |  |  |  |  |

SOFTWARE PROGRAM LISTING                         AMPAK DIVISION/NORI

MAKER S.H.J.         4/1/81      (SUB)ROUTINE  CMPADD

CHKR.                            PRODUCT LINE  SHIPMATE

ENGR. S.H.J.         4/1/81      MODEL #       D

| LOC | CODE | LABEL   | OPERATION | OPERAND | COMMENTS |
|-----|------|---------|-----------|---------|----------|
| 110 | FD   | CMPADD: | MOV       | A,R5    | MSB'S IN R3 & R5, |
| 111 | 37   |         | CPL       | A       | LSB'S IN R2 & R4. |
| 112 | 6B   |         | ADD       | A,R3    | IF R4/R5 LESS THAN R2/R3, |
| 113 | 17   |         | INC       | A       | CARRY RET'D ON, |
| 114 | 96   |         | JNZ       | RTFCMP  | ELSE R4/R5 GREATER THAN OR |
| 115 | 19   |         |           |         | EQUAL TO R2/R3, |
| 116 | FC   |         | MOV       | A,R4    | CARRY RET'D OFF. |
| 117 | 37   |         | CPL       | A       |          |
| 118 | 6A   |         | ADD       | A,R2    |          |
| 119 | 83   | RTFCMP: | RET       |         |          |
| 11A |      |         |           |         |          |
| 11B |      |         |           |         |          |
| 11C |      |         |           |         |          |
| 11D |      |         |           |         |          |
| 11E |      |         |           |         |          |
| 11F |      |         |           |         |          |

SOFTWARE PROGRAM LISTING                         AMPAK DIVISION/NORDS

MAKER S.H.J.         4/1/81      (SUB)ROUTINE  RSDLHT

CHKR.                            PRODUCT LINE  SHIPMATE

ENGR. S.H.J.         4/1/81      MODEL #       D

| LOC | CODE | LABEL   | OPERATION | OPERAND   | COMMENTS |
|-----|------|---------|-----------|-----------|----------|
| 120 | D5   | RSDLHT: | SEL       | RB1       | TIMER INT. DRIVEN ! |
| 121 | B8   |         | MOV       | R0,RHWSP  | SAVE CURRENT |
| 122 | 26   |         |           |           | ACC. VALVE |
| 123 | A0   |         | MOV       | @R0,A     | IN RHWSP |
| 124 | 95   |         | CPL       | F0        | SKIP TIMER WORKSPACE |
| 125 | B6   |         | JF0       | NOTMR     | INC. IF F0 IS OFF. |
| 126 | 2B   |         |           |           | ELSE INCREMENT |
| 127 | B8   |         | MOV       | R0,TMRWSP | TIMER WORKSPACE |
| 128 | 22   |         |           |           |          |
| 129 | 54   |         | CALL      | INCCNT    |          |
| 12A | 00   |         |           |           |          |
| 12B | 76   | NOTMR:  | JF1       | FHIP      | SKIP RES. HT. IF |
| 12C | 6B   |         |           |           | FULL HEAT IN PROGRESS |
| 12D | B8   |         | MOV       | R0,RMXTIM |          |
| 12E | 27   |         |           |           | GET RES. HT. MAX. |
| 12F | F0   |         | MOV       | A,@R0     | TIME AND SEE |
| 130 | AA   |         | MOV       | R2,A      | IF 0DA7H COUNTS |
| 131 | 18   |         | INC       | R0        | HAS OCCURRED. |
| 132 | F0   |         | MOV       | A,@R0     | (120 SECONDS- |
| 133 | AB   |         | MOV       | R3,A      | .01% ACCURATE) |
| 134 | BC   |         | MOV       | R4,0A7H   |          |
| 135 | A7   |         |           |           |          |
| 136 | BD   |         | MOV       | R5,0DH    |          |
| 137 | 0D   |         |           |           |          |
| 138 | 34   |         | CALL      | CMPADD    |          |
| 139 | 10   |         |           |           |          |

SOFTWARE PROGRAM LISTING

MAKER  S.H.J.  4/1/81  (SUB)ROUTINE  RSDLHT

CHKR.  PRODUCT LINE  SHIPMATE

ENGR.  S.H.J.  4/1/81  MODEL #  D

| LOC | CODE | LABEL | OPERATION | OPERAND | COMMENTS |
|---|---|---|---|---|---|
| 13A | F6 | | JC | SOVENF | IF SO, STOP RES. HEAT |
| 13B | 5F | | | | |
| 13C | C8 | | DEC | R0 | ELSE INC. MAX. RES. HT. TIME COUNTER |
| 13D | 54 | | CALL | INCCNT | |
| 13E | 00 | | | | |
| 13F | BF | | MOV | R7,CH2ADD | GET STANDBY HEAT POT READINGS |
| 140 | 40 | | | | |
| 141 | 34 | | CALL | COVCNT | GET STANDBY HEAT POT SETPOINT & MAXIMUM |
| 142 | A0 | | | | |
| 143 | B8 | | MOV | R0,COWSP1 | MULTIPLY SETPOINT WITH 1/2 19H WHICH REPRESENTS .85 SECONDS. |
| 144 | 24 | | | | |
| 145 | F0 | | MOV | A,@R0 | |
| 146 | B9 | | MOV | R1,0CH | |
| 147 | 0C | | | | |
| 148 | 54 | | CALL | MLTPLY | |
| 149 | 10 | | | | |
| 14A | B9 | | MOV | R1,COWSP2 | DIVIDE RESULTS BY MAXIMUM SETPOINT |
| 14B | 25 | | | | |
| 14C | F1 | | MOV | A,@R1 | |
| 14D | A9 | | MOV | R1,A | |
| 14E | 54 | | CALL | DIVIDE | |
| 14F | 30 | | | | |
| 150 | F6 | | JC | SOVENF | IF DIVIDE ERROR, CANCEL OVEN OP. |
| 151 | 5D | | | | |
| 152 | AB | | MOV | R3,A | CHECK TO SEE OF "ON" TIME COUNTER HAS REACHED SETPOINT. |
| 153 | FE | | MOV | A,R6 | |
| 154 | AA | | MOV | R2,A | |
| 155 | 34 | | CALL | CMPBYT | |
| 156 | 00 | | | | |
| 157 | F6 | | JC | OVENF | IF SO, GO TO SHUT OFF OVEN |
| 158 | 5F | | | | |
| 159 | 9A | | ANL | P2,OVENON | ELSE INSURE OVEN IS ON AND GO TO INC. ON TIME COUNTER |
| 15A | F7 | | | | |
| 15B | 24 | | JMP | INCRHC | |
| 15C | 61 | | | | |
| 15D | FE | SOVENF: | MOV | A,R6 | GET R.H. COUNTER. |
| 15E | AA | | MOV | R2,A | MOVE R.H. TIME IN R2 |
| 15F | 8A | OVENF: | ORL | P2,OVENOF | SHUT DOWN OVEN |
| 160 | 08 | | | | |
| 161 | 1A | INCRHC: | INC | R2 | INC. RES. HT. TIME AND COMPARE WITH 19H (.85 SECONDS) |
| 162 | BB | | MOV | R3,19H | |
| 163 | 19 | | | | |
| 164 | 34 | | CALL | CMPBYT | |
| 165 | 00 | | | | |
| 166 | F6 | | JC | RHCYCD | IF EQUAL, RES. HT. CYCLE IS OVER |
| 167 | 71 | | | | |
| 168 | FA | | MOV | A,R2 | ELSE, MOVE RES. HT. TIME INTO ACC. & GO TO FINISH. |
| 169 | 24 | | JMP | FINRH | |
| 16A | 72 | | | | |

SOFTWARE PROGRAM LISTING

MAKER S.H.J. 4/1/81    (SUB)ROUTINE RSDLHT

CHKR.    PRODUCT LINE SHIPMATE

ENGR. S.H.J. 4/1/81    MODEL # D

| LOC | CODE | LABEL | OPERATION | OPERAND | COMMENTS |
|---|---|---|---|---|---|
| 16B | B8 | FHIP: | MOV | R0,RMXTIM | CLEAR RES. HT. |
| 16C | 27 | | | | MAXIMUM TIME |
| 16D | 27 | | CLR | A | COUNTER |
| 16E | A0 | | MOV | @R0,A | |
| 16F | 18 | | INC | R0 | |
| 170 | A0 | | MOV | @R0,A | |
| 171 | 27 | RHCYCD: | CLR | A | RESTORE OR RESET |
| 172 | AE | FINRH: | MOV | R6,A | R.H. CYC. COUNTER |
| 173 | B8 | | MOV | R0,RHWSP | RESTORE |
| 174 | 26 | | | | ACCUMULATOR |
| 175 | F0 | | MOV | A,@R0 | |
| 176 | C5 | | SEL | RB0 | GO BACK TO RB0 |
| 177 | 2E | | XCH | A,R6 | CHECK FRAME DOWN |
| 178 | C6 | | JZ | FDNO | TIMER - IF NOT |
| 179 | 82 | | | | ZERO, INCREMENT. |
| 17A | 17 | | INC | A | IF REACHED 32D |
| 17B | B2 | | JB5 | FDOFF | (1.1 SECONDS), GO TO |
| 17C | 7F | | | | SHUT OFF |
| 17D | 24 | | JMP | FDNO | FRAME DOWN. |
| 17E | 82 | | | | |
| 17F | 89 | FDOFF: | ORL | P1,FDOF | TURN OFF FRAME DOWN. |
| 180 | 02 | | | | |
| 181 | 27 | | CLR | A | |
| 182 | 2E | FDNO: | XCH | A,R6 | RESTORE F.D. TIMER |
| 183 | 26 | | JNT0 | PLATOK | IF PLATEN IN POSITION |
| 184 | 9A | | | | OR TIMER NOT |
| 185 | D5 | | SEL | RB1 | CYCLING, RETURN |
| 186 | 09 | | IN | A,P1 | |
| 187 | 32 | | JB1 | FDNO1 | ELSE ABORT |
| 188 | 98 | | | | ALL OPERATIONS |
| 189 | 27 | | CLR | A | |
| 18A | D7 | | MOV | PSW,A | |
| 18B | C5 | | SEL | RB0 | |
| 18C | E5 | | SEL | MB0 | |
| 18D | 89 | | ORL | P1,0FFH | |
| 18E | FF | | | | |
| 18F | 8A | | ORL | P2,0FFH | |
| 190 | FF | | | | |
| 191 | 15 | | DIS | I | |
| 192 | 35 | | DIS | TCNT1 | |
| 193 | 65 | | STOP | TCNT | |
| 194 | 85 | | CLR | F0 | |
| 195 | A5 | | CLR | F1 | |
| 196 | 04 | | JMP | 00 | |
| 197 | 00 | | | | |
| 198 | F0 | FDNO1: | MOV | A,@R0 | |
| 199 | C5 | | SEL | RB0 | |
| 19A | 93 | PLATOK: | RETR | | |
| 19B | | | | | |
| 19C | | | | | |
| 19D | | | | | |
| 19E | | | | | |
| 19F | | | | | |

SOFTWARE PROGRAM LISTING

AMPAK DIVISION/NORD

MAKER S.H.J. 4/1/81  (SUB)ROUTINE COVERT

CHKR. _____  PRODUCT LINE SHIPMATE

ENGR. S.H.J. 4/1/81  MODEL # D

| LOC | CODE | LABEL | OPERATION | OPERAND | COMMENTS |
|---|---|---|---|---|---|
| 1A0 | 9A | COVERT: | ANL | P2,CH0ADD | ESTABLISH CHANNEL 0 ADDRESS |
| 1A1 | 1F | | | | |
| 1A2 | 9A | | ANL | P2,RSLOW | START CAPACITOR CHARGE |
| 1A3 | FE | | | | |
| 1A4 | BA | | MOV | R2,05H | WAIT 670 Microseconds FOR CAP. TO CHARGE |
| 1A5 | 05 | | | | |
| 1A6 | 14 | | CALL | DELAY | |
| 1A7 | F0 | | | | |
| 1A8 | 34 | | CALL | COVCNT | GET CONVERSION COUNT |
| 1A9 | E0 | | | | |
| 1AA | A9 | | MOV | R1,A | SAVE CH0 IN R1 |
| 1AB | 54 | | CALL | ADDLCH | ESTABLISH REQUESTED POT ADDRESS |
| 1AC | 60 | | | | |
| 1AD | 9A | | ANL | P2,RSLOW | START CAPACITOR CHARGE |
| 1AE | FE | | | | |
| 1AF | 14 | | CALL | DELAY | WAIT FOR CAP. TO CHARGE |
| 1B0 | F0 | | | | |
| 1B1 | 34 | | CALL | COVCNT | GET CONVERSION COUNT |
| 1B2 | E0 | | | | |
| 1B3 | B8 | | MOV | R0,COWSP1 | SAVE RESULTS IN COWSP1 |
| 1B4 | 24 | | | | |
| 1B5 | A0 | | MOV | @R0,A | |
| 1B6 | 8A | | ORL | P2,CH7NAD | ADDRESS MAX. SETPOINT |
| 1B7 | E0 | | | | |
| 1B8 | 9A | | ANL | P2,RSLOW | START CAP. CHARGE |
| 1B9 | FE | | | | |
| 1BA | 14 | | CALL | DELAY | WAIT FOR CAP. TO CHARGE |
| 1BB | F0 | | | | |
| 1BC | 34 | | CALL | COVCNT | GET CONVERSION COUNT |
| 1BD | E0 | | | | |
| 1BE | 18 | | INC | R0 | SAVE MAX. SETPOINT IN COWSP2 |
| 1BF | A0 | | MOV | @R0,A | |
| 1C0 | 34 | | CALL | GETDIF | SUBTRACT CH0 READING FROM MAX. READING |
| 1C1 | F0 | | | | |
| 1C2 | C8 | | DEC | R0 | SUBTRACT CH0 READING FROM POT SETPOINT READING. |
| 1C3 | 34 | | CALL | GETDIF | |
| 1C4 | F0 | | | | |
| 1C5 | F0 | | MOV | A,@R0 | COMPARE VALUES OF SETPOINT TO MAXIMUM |
| 1C6 | AA | | MOV | R2,A | |
| 1C7 | 18 | | INC | R0 | |
| 1C8 | F0 | | MOV | A,@R0 | |
| 1C9 | AB | | MOV | R3,A | |
| 1CA | 34 | | CALL | CMPBYT | |
| 1CB | 00 | | | | |
| 1CC | E6 | | JNC | CONVOK | IF MAXIMUM GREATER THAN SETPOINT, OK, GO TO RETURN. |
| 1CD | DE | | | | |
| 1CE | F0 | | MOV | A,@R0 | SETPOINT GREATER THAN OR EQUAL TO MAXIMUM SO MAKE SETPOINT EQUAL MAXIMUM -1. |
| 1CF | 07 | | DEC | A | |
| 1D0 | C8 | | DEC | R0 | |
| 1D1 | A0 | | MOV | @R0,A | |
| 1D2 | 83 | CONVOK: | RET | | |
| 1D3 | | | | | |
| 1D4 | | | | | |

SOFTWARE PROGRAM LISTING                           AMPAK DIVISION/NOR

MAKER  S.H.J.   4/1/81   (SUB)ROUTINE  COVERT

CHKR. _____   PRODUCT LINE  SHIPMATE

ENGR.  S.H.J.   4/1/81   MODEL #       D

| LOC | CODE | LABEL | OPERATION | OPERAND | COMMENTS |
|-----|------|-------|-----------|---------|----------|
| 1D5 | | | | | |
| 1D6 | | | | | |
| 1D7 | | | | | |
| 1D8 | | | | | |
| 1D9 | | | | | |
| 1DA | | | | | |
| 1DB | | | | | |
| 1DC | | | | | |
| 1DD | | | | | |
| 1DE | | | | | |
| 1DF | | | | | |

SOFTWARE PROGRAM LISTING                           AMPAK DIVISION/NORDS

MAKER  S.H.J.   4/1/81   (SUB)ROUTINE  COVCNT

CHKR. _____   PRODUCT LINE  SHIPMATE

ENGR.  S.H.J.   4/1/81   MODEL #       D

| LOC | CODE | LABEL | OPERATION | OPERAND | COMMENTS |
|-----|------|--------|-----------|---------|----------|
| 1E0 | 27 | COVCNT: | CLR | A | START FROM ZERO |
| 1E1 | 8A |        | ORL | P2,RSHI | START CONVERSION |
| 1E2 | 01 |        |     |         |          |
| 1E3 | 17 | COVLOP: | INC | A | COUNT AND LOOP |
| 1E4 | 56 |        | JTI | COVLOP | UNTIL CONV. DONE |
| 1E5 | E3 |        |     |         |          |
| 1E6 | 83 |        | RET |         |          |
| 1E7 | | | | | |
| 1E8 | | | | | |
| 1E9 | | | | | |
| 1EA | | | | | |
| 1EB | | | | | |
| 1EC | | | | | |
| 1ED | | | | | |
| 1EE | | | | | |
| 1EF | | | | | |

SOFTWARE PROGRAM LISTING

MAKER S.H.J. 4/1/81 (SUB)ROUTINE GETDIF

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 1F0 | F0 | GETDIF: | MOV | A,@R0 | SUBTRACT CONTENTS |
| 1F1 | 37 | | CPL | A | OF R1 FROM |
| 1F2 | 69 | | ADD | A,R1 | CONTENTS OF |
| 1F3 | 37 | | CPL | A | MEMORY ADDRESSED |
| 1F4 | A0 | | MOV | @R0,A | BY R0. |
| 1F5 | 83 | | RET | | |
| 1F6 | | | | | |
| 1F7 | | | | | |
| 1F8 | | | | | |
| 1F9 | | | | | |
| 1FA | | | | | |
| 1FB | | | | | |
| 1FC | | | | | |
| 1FD | | | | | |
| 1FE | | | | | |
| 1FF | | | | | |

SOFTWARE PROGRAM LISTING

MAKER S.H.J. 4/1/81 (SUB)ROUTINE INCCNT

CHKR. _____ PRODUCT LINE SHIPMATE

ENGR. S.H.J. 4/1/81 MODEL # D

| LOC | CODE | LABEL | OPERATION | OPERAND | COMMENTS |
|-----|------|-------|-----------|---------|----------|
| 200 | F0 | INCCNT: | MOV | A,@R0 | INCREMENT CONTENTS |
| 201 | 03 | | ADD | A,01H | AS ADDRESSED BY |
| 202 | 01 | | | | R0 (LSB OF |
| 203 | A0 | | MOV | @R0,A | ADDRESS VALUE) |
| 204 | E6 | | JNC | INCDN | IF NO CARRY, |
| 205 | 08 | | | | RETURN |
| 206 | 18 | | INC | R0 | ELSE INCREMENT |
| 207 | 10 | | INC | @R0 | MSB AT NEXT ADDRESS |
| 208 | 83 | INCDN: | RET | | AND RETURN. |
| 209 | | | | | |
| 20A | | | | | |
| 20B | | | | | |
| 20C | | | | | |
| 20D | | | | | |
| 20E | | | | | |
| 20F | | | | | |

SOFTWARE PROGRAM LISTING

MAKER S.H.J.   4/1/81   (SUB)ROUTINE  MLTPLY

CHKR._____          PRODUCT LINE  SHIPMATE

ENGR. S.H.J.   4/1/81    MODEL #   D

| LOC | CODE | LABEL | OPERATION | OPERAND | COMMENTS |
|---|---|---|---|---|---|
| 210 | B8 | MLTPLY: | MOV | R0,00 | CLEAR MSB OF |
| 211 | 00 | | | | RESULTS |
| 212 | BA | | MOV | R2,08H | ESTABLISH LOOP CTR. |
| 213 | 08 | | | | |
| 214 | 12 | MLTLOP: | JB0 | ADDMLT | IF BIT0 ON, ADD |
| 215 | 1A | | | | MULTIPLIER TO MSB |
| 216 | 28 | | XCH | A,R0 | ELSE SWAP LSB |
| 217 | 97 | | CLR | C | & MSB, CLEAR CARRY, |
| 218 | 44 | | JMP | FINROL | AND GO TO ROLL |
| 219 | 1C | | | | RESULTS RIGHT. |
| 21A | 28 | ADDMLT: | XCH | A,R0 | MULTIPLIER IS ADDED |
| 21B | 69 | | ADD | A,R1 | TO MSB. |
| 21C | 67 | FINROL: | RRC | A | ROLL RESULTS RIGHT |
| 21D | 28 | | XCH | A,R0 | ONCE, DEC.COUNTER, |
| 21E | 67 | | RRC | A | AND LOOP IF NOT |
| 21F | EA | | DJNZ | R2,MLTLOP | DONE. |
| 220 | 14 | | | | |
| 221 | 83 | | RET | | |
| 222 | | | | | |
| 223 | | INPUTS: | A= OPERAND (8 BITS) | | |
| 224 | | | R1= MULTIPLIER (8 BITS) | | |
| 225 | | | | | |
| 226 | | OUTPUT: | A= LSB OF RESULTS (16 BITS) | | |
| 227 | | | R0= MSB OF RESULTS (16 BITS) | | |
| 228 | | | | | |
| 229 | | REGISTERS: | A,R0,R2 - DESTROYED | | |
| 22A | | | R1 - RETURNED | | |
| 22B | | | | | |
| 22C | | | | | |
| 22D | | | | | |
| 22E | | | | | |
| 22F | | | | | |

SOFTWARE PROGRAM LISTING

MAKER S.H.J.   4/1/81   (SUB)ROUTINE  DIVIDE

CHKR._____          PRODUCT LINE  SHIPMATE

ENGR. S.H.J.   4/1/81    MODEL #   D

| LOC | CODE | LABEL | OPERATION | OPERAND | COMMENTS |
|---|---|---|---|---|---|
| 230 | 28 | DIVIDE: | XCH | A,R0 | CHECK TO SEE |
| 231 | 37 | | CPL | A | IF DIVISOR IS |
| 232 | 69 | | ADD | A,R1 | SMALLER THAN |
| 233 | 37 | | CPL | A | DIVIDEND MSB. |
| 234 | F6 | | JC | STRTOK | IF NOT, CONTINUE. |
| 235 | 39 | | | | |
| 236 | A7 | | CPL | C | ELSE - ERROR - |
| 237 | 44 | | JMP | EXITDV | EXIT W/C ON. |
| 238 | 54 | | | | |

SOFTWARE PROGRAM LISTING

MAKER  S.H.J.    4/1/81    (SUB)ROUTINE   DIVIDE

CHKR. _____              PRODUCT LINE   SHIPMATE

ENGR.  S.H.J.    4/1/81    MODEL #        D

| LOC | CODE | LABEL | OPERATION | OPERAND | COMMENTS |
|-----|------|-------|-----------|---------|----------|
| 239 | BA | STRTOK: | MOV | R2,08H | ESTABLISH DIVIDE |
| 23A | 08 |        |     |        | LOOP COUNTER |
| 23B | 69 |        | ADD | A,R1   | ADD DIVISOR TO LSB |
| 23C | 97 | DIVLOP: | CLR | C     | & CLEAR CARRY. |
| 23D | 28 |        | XCH | A,R0   | ROLL DIVIDEND |
| 23E | F7 |        | RLC | A      |  |
| 23F | 28 |        | XCH | A,R0   | LEFT ONCE. |
| 240 | F7 |        | RLC | A      |  |
| 241 | E6 |        | JNC | CHKSIZ | IF NO CARRY, GO TO |
| 242 | 48 |        |     |        | CHECK MSB BIT7. |
| 243 | 37 |        | CPL | A      | ELSE SUBTRACT |
| 244 | 69 |        | ADD | A,R1   | REMAINDER FROM MSB |
| 245 | 37 |        | CPL | A      | AND GO TO SET |
| 246 | 44 |        | JMP | SETBIT | B0 OF RESULTS |
| 247 | 50 |        |     |        |  |
| 248 | 37 | CHKSIZ: | CPL | A     | SUBTRACT DIVISOR |
| 249 | 69 |        | ADD | A,R1   | FROM MSB. IF |
| 24A | 37 |        | CPL | A      | CARRY ON, GO |
| 24B | E6 |        | JNC | SETBIT | TO SET ON B0 |
| 24C | 50 |        |     |        | OF RESULTS. |
| 24D | 69 |        | ADD | A,R1   | ELSE RESTORE MSB |
| 24E | 44 |        | JMP | DECCNT | & GO TO CONTINUE |
| 24F | 51 |        |     |        |  |
| 250 | 18 | SETBIT: | INC | R0    | SET B0 OF REMAINDER |
| 251 | EA | DECCNT: | DJNZ | R2,DIVLOP | CONTINUE LOOPING |
| 252 | 3C |        |     |        | IF CTR NOT ZERO |
| 253 | 97 |        | CLR | C      | RESET ERROR FLAG |
| 254 | 28 | EXITDV: | XCH | A,R0  | PUT RESULTS IN ACC. |
| 255 | 83 |        | RET |        |  |
| 256 |    |        |     |        |  |
| 257 |    |        |     |        |  |
| 258 |    |        |     |        |  |
| 259 |    | INPUTS: | A=LSB OF DIVIDEND | | (16 BITS) |
| 25A |    |        | R0=MSB OF DIVIDEND | | |
| 25B |    |        | R1=DIVISOR | | |
| 25C |    |        |     |        |  |
| 25D |    | OUTPUTS: | A=QUOTIENT | | |
| 25E |    |        | R0=REMAINDER | | |
| 25F |    |        | CARRY=0 IF OK,1 IF ERROR ( SUCH | | |
|     |    |        |     | AS DIVISOR IS SMALLER | |
|     |    |        |     | THAN MSB OF DIVIDEND) | |

REGISTERS:A,R0,R1,R2 DESTROYED

SOFTWARE PROGRAM LISTING

MAKER  S.H.J.   4/1/81      (SUB)ROUTINE  ADDLCH

CHKR. _____   PRODUCT LINE  SHIPMATE

ENGR.  S.H.J.   4/1/81      MODEL #    D

| LOC | CODE | LABEL | OPERATION | OPERAND | COMMENTS |
|-----|------|-------|-----------|---------|----------|
| 260 | 0A   |       | IN        | A,P2    | READ P2. |
| 261 | 53   |       | ANL       | A,1FH   | CLEAR BITS 1,2, &3 |
| 262 | 1F   |       |           |         |          |
| 263 | 4F   |       | ORL       | A,R7    | SET BITS FROM R7 |
| 264 | 3A   |       | OUTL      | P2,A    | OUTPUT RESULTS |
| 265 | 83   |       | RET       |         | & RETURN. |
| 266 |      |       |           |         |          |
| 267 |      |       |           |         |          |
| 278 |      |       |           |         |          |
| 269 |      |       |           |         |          |
| 26A |      |       |           |         |          |
| 26B |      |       |           |         |          |
| 26C |      |       |           |         |          |
| 26D |      |       |           |         |          |
| 26E |      |       |           |         |          |
| 26F |      |       |           |         |          |

SOFTWARE PROGRAM LISTING

MAKER  S.H.J.   4/1/81      (SUB)ROUTINE  INDLCH

CHKR. _____   PRODUCT LINE  SHIPMATE

ENGR.  S.H.J.   4/1/81      MODEL #    D

| LOC | CODE | LABEL   | OPERATION | OPERAND   | COMMENTS |
|-----|------|---------|-----------|-----------|----------|
| 270 | 8A   | INDLCH: | ORL       | P2,CLRLED | SET E/C HIGH (CLEAR LED'S) |
| 271 | 10   |         |           |           |          |
| 272 | 54   |         | CALL      | ADDLCH    | ESTABLISH ADDRESS |
| 273 | 60   |         |           |           |          |
| 274 | 9A   |         | ANL       | P2,LCHLED | LATCH LED |
| 275 | EF   |         |           |           |          |
| 276 | 83   |         | RET       |           |          |
| 277 |      |         |           |           |          |
| 278 |      |         |           |           |          |
| 279 |      |         |           |           |          |
| 27A |      |         |           |           |          |
| 27B |      |         |           |           |          |
| 27C |      |         |           |           |          |
| 27D |      |         |           |           |          |
| 27E |      |         |           |           |          |
| 27F |      |         |           |           |          |

SOFTWARE PROGRAM LISTING

MAKER  S.H.J.    4/1/81    (SUB)ROUTINE  RETURN

CHKR. _____       PRODUCT LINE  SHIPMATE

ENGR. S.H.J.    4/1/81    MODEL #   D

| LOC | CODE | LABEL | OPERATION | OPERAND | COMMENTS |
|---|---|---|---|---|---|
| 3E0 | 15 | RETURN: | DIS | I | |
| 3E1 | 35 | | DIS | TCNTI | |
| 3E2 | 25 | | EN | TCNTI | |
| 3E3 | 27 | | CLR | A | |
| 3E4 | D7 | | MOV | PSW,A | |
| 3E5 | 04 | | JMP | ENDCYC | |
| 3E6 | 81 | | | | |
| 3E7 | | | | | |
| 3E8 | | | | | |
| 3E9 | | | | | |
| 3EA | | | | | |
| 3EB | | | | | |
| 3EC | | | | | |
| 3ED | | | | | |
| 3EE | | | | | |
| 3EF | | | | | |

SOFTWARE PROGRAM LISTING

MAKER  S.H.J.    4/1/81    (SUB)ROUTINE  (DATA MEMORY)

CHKR. _____       PRODUCT LINE  SHIPMATE

ENGR. S.H.J.    4/1/81    MODEL #   D

| LOC | CODE | LABEL | OPERATION | OPERAND | COMMENTS |
|---|---|---|---|---|---|
| 00 | | RB0 R0 | | | |
| 01 | | R1 | | | |
| 02 | | R2 | | | |
| 03 | | R3 | | | |
| 04 | | R4 | | | |
| 05 | | R5 | | | |
| 06 | | R6 | | | |
| 07 | | R7 | | | |
| 08 | | STACK | | | |
| 09 | | | | | |
| 0A | | | | | |
| 0B | | | | | |
| 0C | | | | | |
| 0D | | | | | |
| 0E | | | | | |
| 0F | | | | | |
| 00 | | | | | |
| 11 | | | | | |
| 12 | | | | | |
| 13 | | | | | |
| 14 | | | | | |
| 15 | | | | | |
| 16 | | | | | |
| 17 | | | | | |

SOFTWARE PROGRAM LISTING

MAKER  S.H.J.   4/1/81     (SUB)ROUTINE  (DATA MEMORY)

CHKR.                      PRODUCT LINE  SHIPMATE

ENGR.  S.H.J.   4/1/81     MODEL #   D

| LOC | CODE | LABEL | OPERATION | OPERAND | COMMENTS |
|-----|------|-------|-----------|---------|----------|
| 18  |      | RB1 R0 |          |         |          |
| 19  |      | R1    |           |         |          |
| 1A  |      | R2    |           |         |          |
| 1B  |      | R3    |           |         |          |
| 1C  |      | R4    |           |         |          |
| 1D  |      | R5    |           |         |          |
| 1E  |      | R6    |           |         |          |
| 1F  |      | R7    |           |         |          |
| 20  |      | MAXTIM |          |         |          |
| 21  |      | ↓     |           |         |          |
| 22  |      | TMRWSP |          |         |          |
| 23  |      | ↓     |           |         |          |
| 24  |      | COWSP1 |          |         |          |
| 25  |      | COWSP2 |          |         |          |
| 26  |      | RHWSP |           |         |          |
| 27  |      | RMXTIM |          |         |          |
| 28  |      | ↓     |           |         |          |
| 29  |      |       |           |         |          |
| 2A  |      |       |           |         |          |
| 2B  |      |       |           |         |          |
| 2C  |      |       |           |         |          |
| 2D  |      |       |           |         |          |
| 2E  |      |       |           |         |          |
| 2F  |      |       |           |         |          |
| 30  |      |       |           |         |          |
| 31  |      |       |           |         |          |
| 32  |      |       |           |         |          |
| 33  |      |       |           |         |          |
| 34  |      |       |           |         |          |
| 35  |      |       |           |         |          |
| 36  |      |       |           |         |          |
| 37  |      |       |           |         |          |
| 38  |      |       |           |         |          |
| 39  |      |       |           |         |          |
| 3A  |      |       |           |         |          |
| 3B  |      |       |           |         |          |
| 3C  |      |       |           |         |          |
| 3D  |      |       |           |         |          |
| 3E  |      |       |           |         |          |
| 3F  |      |       |           |         |          |

What is claimed is:

1. A control arrangement for operating a skin packaging machine including a film supply, an oven, a film-bearing frame, a base having a perforated surface, means for drawing a vacuum at the surface, and means for moving the frame from a position adjacent the oven to a position adjacent the perforated surface, comprising:

a microcomputer;

an analog-to-digital converter subsystem coupled to the microcomputer and having input channels addressable by the microcomputer;

a plurality of operator variable controls including controls for timing the energization of the oven, each said variable control being coupled to a different addressable channel of the converter subsystem;

a plurality of external inputs including switches whose conditions are indicative of the frame position coupled to the microcomputer;

a plurality of controlled outputs including outputs operable to effect the movement of the frame, energization of the oven, and generation of the vacuum, coupled to the microcomputer, the microcomputer being programmed to accept the inputs, including the operator variable control inputs by addressing the converter subsystem and, in response to said inputs, to control the skin packaging machine outputs.

2. A method for controlling an industrial machine during an operational cycle and for monitoring a plurality of variable proportional control inputs comprising the steps of:

(a) recalling a maximum value for one of the control inputs;

(b) addressing the proportional control input corresponding to the recalled maximum value;

(c) determining the proportional setting of the addressed control;

(d) multiplying the determined proportion by the recalled maximum value to determine a proportional value;

(e) controlling the industrial machine in response to the said proportional value;

(f) repeating the steps (c) through (e) during at least a segment of the industrial machine operational cycle, whereby changes in said proportional setting will effect changes in machine control during at least said segment of the operating cycle.

3. The method of claim 2, wherein said setting is a proportional time setting and the proportional value is segment time, which further includes, after the step (e), the step of:

(e1) comparing the proportional value to an elapsed time and subsequently addressing a different control if the elapsed time equals or exceeds the proportional value, the step (f) comprising repeating the steps (c) through (e1).

4. A control arrangement for an industrial machine having multiple functions comprising:

an analog-to-digital converter subsystem having a plurality of analog input channels and an output, the subsystem being responsive to address signals to couple an addressed input channel to the output;

a plurality of operator variable analog controls each having an output coupled to a different one of said analog input channels, each said control output being representative of a proportional setting for a machine function associated with the control; and a program controlled microcomputer, having a memory for storing a plurality of maximum values each associated with a different one of said analog controls, including, (i) means for recalling a maximum value associated with one of the analog controls from memory, (ii) means for supplying an address signal for the analog-to-digital converter subsystem to couple the input channel for said analog control to the converter subsystem output and for reading the associated proportional setting for the control from said output, and (iii) means for multiplying said proportional setting by said maximum value to determine a proportional value for the associated control, and for outputting a control signal representative of said proportional value to the industrial machine.

* * * * *